US011264035B2

(12) United States Patent
Bhowmik et al.

(10) Patent No.: US 11,264,035 B2
(45) Date of Patent: Mar. 1, 2022

(54) AUDIO SIGNAL PROCESSING FOR AUTOMATIC TRANSCRIPTION USING EAR-WEARABLE DEVICE

(71) Applicant: Starkey Laboratories, Inc, Eden Prairie, MN (US)

(72) Inventors: Achintya Kumar Bhowmik, Cupertino, CA (US); David Alan Fabry, Eden Prairie, MN (US); Amit Shahar, Hod HaSharon (IL); Clifford Anthony Tallman, Hopkins, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 118 days.

(21) Appl. No.: 16/732,756

(22) Filed: Jan. 2, 2020

(65) Prior Publication Data
US 2020/0219515 A1  Jul. 9, 2020

Related U.S. Application Data

(60) Provisional application No. 62/788,816, filed on Jan. 5, 2019.

(51) Int. Cl.
*G10L 17/00* (2013.01)
*G06F 3/01* (2006.01)
(Continued)

(52) U.S. Cl.
CPC .............. *G10L 17/00* (2013.01); *G06F 3/012* (2013.01); *G10L 17/04* (2013.01); *H04R 1/1016* (2013.01); *H04R 1/1041* (2013.01)

(58) Field of Classification Search
CPC ........ G06F 3/012; G06F 3/013; G06F 3/0481; G06F 3/165; G06F 40/58; G06N 3/08;
(Continued)

(56) References Cited

U.S. PATENT DOCUMENTS 5,526,407 A   6/1996  Russell et al.
6,236,969 B1  5/2001  Ruppert et al.
(Continued)

FOREIGN PATENT DOCUMENTS

DE   10145994   4/2003
EP    2806618  11/2014
(Continued)

OTHER PUBLICATIONS

"International Search Report and Written Opinion," for PCT Application No. PCT/US2020/012173 dated Mar. 23, 2020 (13 pages).
(Continued)

*Primary Examiner* — Gerald Gauthier
(74) *Attorney, Agent, or Firm* — Pauly, DeVries Smith & Deffner LLC (57) ABSTRACT

A system and method of automatic transcription using a visual display device and an ear-wearable device. The system is configured to process an input audio signal at the display device to identify a first voice signal and a second voice signal from the input audio signal. A representation of the first voice signal and the second voice signal can be displayed on the display device and input can be received comprising the user selecting one of the first voice signal and the second voice signal as a selected voice signal. The system is configured to convert the selected voice signal to text data and display a transcript on the display device. The system can further generate an output signal sound at the first transducer of the ear-wearable device based on the input audio signal.

21 Claims, 8 Drawing Sheets

(51) Int. Cl.
*G10L 17/04* (2013.01)
*H04R 1/10* (2006.01)

(58) Field of Classification Search
CPC ......... G10L 15/26; G10L 17/00; G10L 17/04; G10L 21/055; G10L 13/0335; G10L 25/84; H04B 5/0031; H04M 9/085; H04R 1/1016; H04R 1/1041; B60R 25/257; G16H 40/67; H04N 5/2252
USPC ............ 704/3, 235, 233, 271; 381/312, 401; 455/556.1
See application file for complete search history.

(56) References Cited

U.S. PATENT DOCUMENTS

| | | | |
|---|---|---|---|
| 6,560,468 | B1 | 5/2003 | Boesen |
| 6,779,030 | B1 | 8/2004 | Dugan et al. |
| 6,879,698 | B2 | 4/2005 | Boesen |
| 7,512,414 | B2 | 3/2009 | Jannard et al. |
| 8,825,468 | B2* | 9/2014 | Jacobsen ............... G06F 40/58 704/3 |
| 9,129,291 | B2* | 9/2015 | Goldstein ................. B25F 5/00 |
| 9,167,356 | B2 | 10/2015 | Higgins et al. |
| 9,740,686 | B2* | 8/2017 | Johansson ............... G10L 15/32 |
| 9,848,273 | B1 | 12/2017 | Helwani et al. |
| 9,980,033 | B2 | 5/2018 | Boesen |
| 9,992,316 | B2 | 6/2018 | Hardi |
| 10,051,364 | B2* | 8/2018 | Kim ........................ G06F 3/165 |
| 10,219,063 | B1* | 2/2019 | Valenzuela ............. H04R 1/222 |
| 10,224,057 | B1* | 3/2019 | Chevrier ............ H04M 3/42391 |
| 10,249,305 | B2* | 4/2019 | Yu ........................ G10L 21/0272 |
| 10,332,513 | B1 | 6/2019 | D'Souza et al. |
| 10,643,611 | B2 | 5/2020 | Lindahl |
| 10,777,202 | B2* | 9/2020 | Mindlin .................... H04S 7/40 |
| 10,957,337 | B2* | 3/2021 | Chen ........................ G10L 15/16 |
| 2006/0034481 | A1* | 2/2006 | Barzegar ................. H04L 65/80 381/401 |
| 2006/0167687 | A1* | 7/2006 | Kates ..................... G09B 21/009 704/235 |
| 2008/0031475 | A1 | 2/2008 | Goldstein |
| 2008/0195394 | A1* | 8/2008 | Francioli .................. G09B 5/06 704/271 |
| 2008/0253583 | A1 | 10/2008 | Goldstein et al. |
| 2009/0204410 | A1 | 8/2009 | Mozer et al. |
| 2010/0036667 | A1 | 2/2010 | Byford et al. |
| 2010/0222098 | A1* | 9/2010 | Garg ................. H04M 1/72436 455/556.1 |
| 2012/0078628 | A1* | 3/2012 | Ghulman ............. G02B 27/017 704/235 |
| 2013/0054237 | A1* | 2/2013 | Furman .................. G10L 15/26 704/235 |
| 2013/0144622 | A1 | 6/2013 | Yamada et al. |
| 2014/0122073 | A1* | 5/2014 | Goldstein ............... G06F 3/165 704/235 |
| 2014/0163982 | A1 | 6/2014 | Daborn et al. |
| 2014/0236594 | A1* | 8/2014 | Clarke ..................... G10L 15/26 704/233 |
| 2015/0036856 | A1 | 2/2015 | Pruthi et al. |
| 2015/0168996 | A1 | 6/2015 | Sharpe et al. |
| 2015/0230022 | A1 | 8/2015 | Sakai et al. |
| 2015/0319546 | A1* | 11/2015 | Sprague ................. H04R 1/105 381/312 |
| 2017/0155756 | A1* | 6/2017 | Kim ..................... G10L 21/0208 |
| 2017/0243582 | A1* | 8/2017 | Menezes ................ G10L 13/033 |
| 2017/0358317 | A1 | 12/2017 | James |
| 2018/0063624 | A1 | 3/2018 | Boesen |
| 2018/0103859 | A1 | 4/2018 | Provenzano |
| 2018/0113673 | A1* | 4/2018 | Sheynblat ............ H04R 1/1016 |
| 2018/0122025 | A1 | 5/2018 | Boesen |
| 2018/0158365 | A1* | 6/2018 | Roche .................. G09B 17/003 |
| 2018/0201226 | A1* | 7/2018 | Falkson .................. G06F 21/32 |
| 2018/0211658 | A1 | 7/2018 | Segal et al. |
| 2018/0317837 | A1 | 11/2018 | Burwinkel et al. |
| 2018/0341582 | A1 | 11/2018 | Moon et al. |
| 2018/0343527 | A1 | 11/2018 | Edwards |
| 2019/0007540 | A1 | 1/2019 | Shaik et al. |
| 2019/0371315 | A1 | 12/2019 | Newendorp et al. |
| 2020/0077892 | A1* | 3/2020 | Tran ..................... G08B 25/016 |
| 2020/0104194 | A1 | 4/2020 | Chalmers et al. |
| 2020/0152185 | A1 | 5/2020 | Usher et al. |
| 2020/0219506 | A1 | 7/2020 | Bhowmik et al. |
| 2020/0219515 | A1* | 7/2020 | Bhowmik ............. G06F 3/0346 |
| 2021/0258703 | A1* | 8/2021 | Wexler ................... G03B 31/00 |

FOREIGN PATENT DOCUMENTS

| | | |
|---|---|---|
| EP | 2991372 | 3/2016 |
| WO | 2014190086 | 11/2014 |
| WO | 2016050724 | 4/2016 |
| WO | 2017134300 | 8/2017 |
| WO | 2020142679 | 7/2020 |
| WO | 2020142680 | 7/2020 |

OTHER PUBLICATIONS

"International Search Report and Written Opinion," for PCT Application No. PCT/US2020/012174 dated Apr. 6, 2020 (13 pages).
"International Preliminary Report on Patentability," for PCT Application No. PCT/US2020/012173 dated Jul. 15, 2021 (8 pages).
"International Preliminary Report on Patentability," for PCT Application No. PCT/US2020/012174 dated Jul. 15, 2021 (9 pages).
"Non-Final Office Action," for U.S. Appl. No. 16/732,821 dated Jul. 15, 2021 (24 pages).
"Notice of Allowance," for U.S. Appl. No. 16/732,821 dated Oct. 22, 2021 (12 pages).

* cited by examiner

AUDIO SIGNAL PROCESSING FOR AUTOMATIC TRANSCRIPTION USING EAR-WEARABLE DEVICE

This application claims the benefit of U.S. Provisional Application No. 62/788,816, filed Jan. 5, 2019, the content of which is herein incorporated by reference in its entirety.

FIELD

Embodiments herein relate to a system including an ear-wearable device for processing an input audio signal to identify distinct voice signals.

SUMMARY

In a first aspect, a method of automatic transcription uses a visual display device and an ear-wearable device, wherein the ear-wearable device includes a first control circuit, a first electroacoustic transducer for generating sound in electrical communication with the first control circuit, a first microphone in electrical communication with the first control circuit, a memory storage, and a wireless communication device, the visual display device can include a second control circuit and a second wireless communication device. The method includes receiving an input audio signal at the display device, processing the input audio signal to identify a first voice signal and a second voice signal from the input audio signal, wherein the first voice signal includes characteristics indicating a first source for the first voice signal and the second voice signal includes characteristics indicating a second source for the voice signal, and displaying on the display device a representation of the first voice signal and the second voice signal. The method further includes receiving user input selecting one of the first voice signal and the second voice signal as a selected voice signal, converting the selected voice signal to text data, displaying a transcript on the display device, wherein the transcript includes content spoken in the input audio signal, and generating an output signal sound at the first transducer of the ear-wearable device based on the input audio signal.

In a second aspect, in addition to one or more of the preceding or following aspects, or in the alternative to some aspects, the method further includes storing a voice profile that includes characteristics indicating a specific speaker for the first voice signal or the second voice signal.

In a third aspect, in addition to one or more of the preceding or following aspects, or in the alternative to some aspects, the method includes associating the stored voice profile with a contact record can include a name of the specific speaker.

In a fourth aspect, in addition to one or more of the preceding or following aspects, or in the alternative to some aspects, the method includes assigning a priority level to the first voice signal or the second voice signal, wherein a higher priority is assigned to any voice signal having a stored voice profile.

In a fifth aspect, in addition to one or more of the preceding or following aspects, or in the alternative to some aspects, displaying the transcript on the display device includes prioritizing content spoken by a specific speaker associated with a stored voice profile.

In a sixth aspect, in addition to one or more of the preceding or following aspects, or in the alternative to some aspects, the method further can include: detecting, in the input audio signal, a known voice signal associated with the stored voice profile, and either: displaying on the display device a prompt to ask a user whether to transcribe the known voice signal, or outputting an audio query signal to the first transducer of the ear-wearable device to ask the user whether to transcribe the known voice signal.

In a seventh aspect, in addition to one or more of the preceding or following aspects, or in the alternative to some aspects, the method further includes: displaying on the display device a prompt requesting user input on a direction of a desired voice signal.

In an eighth aspect, in addition to one or more of the preceding or following aspects, or in the alternative to some aspects, the method further includes: detecting a user voice signal from a user wearing the ear-wearable device, and processing the input audio signal to exclude content of the user voice signal from the transcript.

In a ninth aspect, in addition to one or more of the preceding or following aspects, or in the alternative to some aspects, the method further includes receiving user input at the ear-wearable device and wirelessly transmitting the user input to the display device.

In a tenth aspect, in addition to one or more of the preceding or following aspects, or in the alternative to some aspects, the method includes receiving user input at the ear-wearable device includes one of: detecting a vibration sequence can include one or more taps on the ear-wearable device by the first microphone or by an inertial motion sensor in the ear-wearable device, detecting a head nod motion or a head shake motion of a user by an inertial motion sensor in the ear-wearable device, and receiving voice commands at the first microphone.

In an eleventh aspect, a system of automatic transcription is included having an ear-wearable device, where the ear-wearable device includes a first control circuit, a first electroacoustic transducer for generating sound in electrical communication with the first control circuit, a first microphone in electrical communication with the first control circuit, a memory storage, and a wireless communication device. The system further includes a visual display device, which includes a second control circuit, a second wireless communication device, and memory. The memory of the visual display device stores computer instructions for instructing the second control circuit to perform: receiving an input audio signal at the display device and processing the input audio signal to identify a first voice signal and a second voice signal from the input audio signal, wherein the first voice signal includes characteristics indicating a first source for the voice signal, and the second voice signal includes characteristics indicating a second source for the voice signal. The memory further stores instructions for displaying on the display device a representation of the first voice signal and the second voice signal, receiving user input selecting one of the first voice signal and the second voice signal as a selected voice signal, and converting the selected voice signal to text data. The memory further stores instructions for displaying a transcript on the display device, wherein the transcript includes content spoken in the input audio signal, and generating an output signal sound at the first transducer of the ear-wearable device based on the input audio signal.

In a twelfth aspect, in addition to one or more of the preceding or following aspects, or in the alternative to some aspects, the memory further stores computer instructions for instructing the second control circuit to: store a voice profile can include characteristics indicating a specific speaker for the first voice signal.

In a thirteenth aspect, in addition to one or more of the preceding or following aspects, or in the alternative to some aspects, the memory further stores computer instructions for instructing the second control circuit to associate the stored voice profile with a contact record can include a name of the specific speaker.

In a fourteenth aspect, in addition to one or more of the preceding or following aspects, or in the alternative to some aspects, the memory further stores computer instructions for instructing the second control circuit to assign a priority level to the first voice signal or the second voice signal, wherein a higher priority is assigned to any voice signal having a stored voice profile.

In a fifteenth aspect, in addition to one or more of the preceding or following aspects, or in the alternative to some aspects, the memory further stores computer instructions for instructing the second control circuit to prioritize content spoken by a specific speaker associated with a stored voice profile.

In a sixteenth aspect, in addition to one or more of the preceding or following aspects, or in the alternative to some aspects, the memory further stores computer instructions for instructing the second control circuit to: detect a known voice signal associated with a stored voice profile in the input audio signal, and either: display on the display device a prompt to ask a user whether to transcribe the known voice signal, or output an audio query signal to the first transducer of the ear-wearable device to ask the user whether to transcribe the known voice signal.

In a seventeenth aspect, in addition to one or more of the preceding or following aspects, or in the alternative to some aspects, the memory further stores computer instructions for instructing the second control circuit to: display on the display device a prompt requesting user input on a direction of a desired voice signal.

In an eighteenth aspect, in addition to one or more of the preceding or following aspects, or in the alternative to some aspects, the memory further stores computer instructions for instructing the second control circuit to: detect a user voice signal from a user wearing the ear-wearable device, and processing the input audio signal to exclude content of the user voice signal from the transcript.

In a nineteenth aspect, in addition to one or more of the preceding or following aspects, or in the alternative to some aspects, the memory further stores computer instructions for instructing the second control circuit to: receive user input at the ear-wearable device and wirelessly transmit the user input to the display device.

In a twentieth aspect, in addition to one or more of the preceding or following aspects, or in the alternative to some aspects, the memory storage of the ear-wearable device memory stores computer instructions for receiving user input at the ear-wearable device by performing: detecting a vibration sequence can include a plurality of taps on the ear-wearable device by the first microphone or by an inertial motion sensor in the ear-wearable device, detecting a head nod motion or a head shake motion of a user by an inertial motion sensor in the ear-wearable device, or receiving voice commands at the first microphone.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

In a system including an ear-wearable device and a display device, audio input is converted to text and presented on a display. The system may store audio signatures of specific individuals and use the audio signatures to determine which sounds to transcribe. For example, in a noisy environment, the system identifies the audio input coming from specific individuals and transcribes the audio input from those individuals. An audio signature may be associated with a contact record, which can include the name of a person. The system may preferentially automatically transcribe a known person, known persons, specified persons, such as favorite persons, or may provide the user with an option to transcribe for the same people.

The system can assist a user with understand what is being said where understanding can be increased by using visual information. The user can read text on the display device to increase understanding. Many people, especially hearing-impaired people, are in situations where they struggle to understand what is being said. One common example is conversations with a person speaking in an accent or a different language.

A microphone in a display device, smart phone or other device or ear-wearable device may pick up sounds from its surroundings. Input from an audio coils or Bluetooth stream may also provide an input audio signal. The sound may be relayed to the ear of a user (e.g., via a hearing aid receiver). The sound may also be sent to a smart device app (e.g., directly from a smartphone mic, or over a wireless connection.) The sound may be converted to text on a user interface (e.g., on a smart device). A user interface on a UI may allow a user to enter an input (e.g., slide a bar) to make text bigger or smaller. The device may generate text only from sounds from another person. For example, the system may transcribe what is said by a person to whom a wearer is speaking, but not the words of the hearing aid wearer.

The input may be via a directional microphone (e.g., in a hearing aid or a puck.) The directional input may enable transcription of words only of a person of interest. For example, a hearing aid may use one or more inertial sensors or other sensors to determine a relative position of speakers compared to the wearer and may be configured to only transcribe sound in front of the wearer. A system may receive or send a signal to only transcribe from a voice in front, or to left, or right, or above, or below, or at a specified angle or orientation from a user reference point.

In some examples, the system for automatic transcription is used with two ear-wearable devices, each having a microphone and being at a fixed position with respect to each other. Because of these two microphones, located on both sides of the user's head, the system can triangulate the voice signal. For example, the system may determine who among a group of people is the person to whom the user is listening.

The system may store voice signal profiles for user favorites. The system may save a voice recording of a known person and preferential transcribe that person. One example of preferentially transcribing or prioritizing transcription, for example, is that the system may transcribe that person's speech or portions of that person's speech before transcribing another person's speech in an audio signal. The system may be configured to assign or allow a user to assign a priority level to a voice signal. The system may be configured to automatically assign a higher priority to any voice signal having a stored voice profile. When displaying the transcript on the display device, content spoken by a specific speaker associated with a stored voice profile can be prioritized, such as by displaying the content in a different font, a larger font, a bold font, with highlighting, or in other ways to draw attention to the content.

In various examples, a user or a system (e.g., automatically) may select a person, select a direction, or both. For example, the system may identify where Gilbert is at, and track Gilbert at or from that location, or track an identified person as they move relative to the ear-wearable devices based on the audio input signal that includes Gilbert's voice.

In some examples, a system may "find favorites" in an auditory environment (e.g., identify a known person.) The system may give the user an option to identify a speaker or reject a speaker. The user may respond to identify a speaker, such as by inputting identifying information such as one or more initials, a relationship, a name, a photograph, or other information. The user may respond to reject the option to identify the speaker, so that the system does not save a voice profile for the speaker. In addition, the user may be asked whether the system should exclude the speaker's content from a transcript.

The system may integrate with a camera. In one embodiment, the system includes a wearable camera, for example a wearable camera on smart glasses. The camera may provide input to the system to aid identification of a speaker by performing facial recognition analysis or ocular recognition analysis. If the system identifies a speaker using facial recognition, the system may use a stored voice profile for that speaker to improve the quality of the transcript or preferentially transcribe that speaker.

Figure 8:
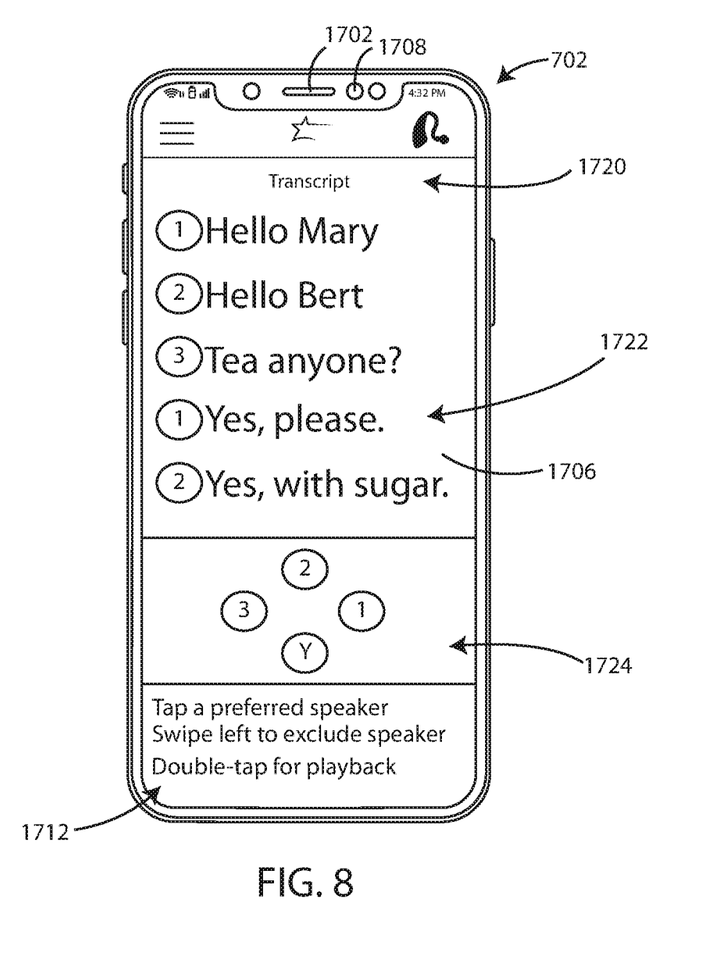
FIGS. 8 and 9 are schematic views of an external visual display device and elements of a display screen thereof in accordance with various embodiments herein.

A system may provide a chat view, for example, show multiple people and who what each person said, similar to a play script. FIG. 8 shows one example of a display device displaying a transcript with numbers identifying each different speaker.

A system may recognize if a phone is held with a microphone pointing away from the user or towards the user. The system may respond by flipping the text so the user can read the text. Directional detection, volume detection, or another type of analysis of the user's voice signal or other voice signals by a microphone on the display device can provide information to determine if the phone is held with the microphone pointing away from the user or towards the user.

In some examples, the system may understand speech in noise, optionally with use of visual information and this may be used to create a transcription or generate machine-generated audio or machine-augmented audio or both. Examples of visual information include lip shape or mouth shape in combination with audio information. The transcription may be saved for later access. The ability to access the transcript later can provide the ability to review, and perhaps for the first time, understand, important information, such as spoken information at a doctor appointment or meeting.

A transcript or notes from a verbal interaction can be delivered to the wearer of the ear-wearable devices, such as using an application running on the display device. In some embodiments, an application designed to be used by the wearer of the ear-wearable device is used to display the transcript or notes to the wearer. In some embodiments, a companion application is present on a companion's display device, designed to be used by a companion or caregiver for the wearer of the ear-wearable devices. In one example, the transcript provided by the system is sent by the wearer's application through the internet to the companion application at the companion's display device. In one example, a caregiver using a caregiver application can view the transcript or notes from verbal interactions that are conducted by the wearer. One example of a use context is that a caregiver or companion could view a transcript of a wearer's visit to a doctor office, to facilitate ongoing medical support of the wearer. In various example, a wearer's application provides a notice that the transcript will be provided to a companion or caregiver. In various embodiments, the wearer provides legal consent for the transcript to be available to a companion or caregiver. In various examples, other participants in a verbal interaction with the wearer provide consent to be recorded and transcribed. In various embodiments, the display device provides notice to a wearer, and provides a notice that a wearer can show to other participants in a conversation, that the verbal interaction will be recorded and transcribed.

The system may have the ability to translate the content of the audio signal to a language different than what was spoken. For example, the system may hear a voice signal in the French language and show content in English text. To accomplish this translation, the system may use an internet-based transcription service (e.g., Google).

The system may include a timestamp in the transcript to show the sequence of a conversation. The system may distinguish between users through voice signature.

The system may recognize layered audio streams. The system may present or save the layered audio streams as separate transcripts or files. For example, the system may differentiate different speakers or conversations in a complex environment based on direction or speaker recognition or cadence of conversation or any combination thereof.

In some examples, when there are several parties to a conversation, each party may have an accessory microphone that streams audio to a hub device (e.g., gateway device). The separate streams may be transcribed and optionally layered. In some examples, a user may be permitted to select a specific audio stream for transcription. In some examples, a user may select from different transcriptions on a smart device for viewing.

Interactions with ear-wearable devices may include gestures that are detected by the ear-wearable device such as tapping the ear-wearable device, swiping the ear-wearable device, nodding the head, or shaking the head. Gestures may be detected using inertial motion sensors (IMUs). Gestures that create vibrations, such as tapping, may be detected by a microphone. The ear-wearable device may also detect the user's voice to provide input or commands to the system.

Interactions with the display device may also be used to provide input to the system, such as tapping a portion of the screen, swiping a portion of the screen, or detection of voice commands or content at the microphone of the display device.

These inputs and interactions with the display device and the ear-wearable device may be used to instruct the system to take a variety of actions such as activating the transcription system, rejecting a voice signal for transcription, rejecting a voice signal for storing, storing a voice signal, changing the size of the transcript text, playing back at the ear-wearable device a recent portion of a recording of the audio input stream, such as the last 5 seconds, 10 seconds, 20 seconds, or 30 seconds.

In some examples, the user taps on the ear-wearable device, or taps a specific sequence on the ear-wearable device, to activate an application running on the display device, activate the transcription service, activate a system controlling the ear-wearable device on the display device, or generate user input for an application running on the display device. In some example, the user swipes across a voice signal representation on the display device to reject that voice signal, delete content from that speaker from the transcript, or both. Other possible examples include voice command based deletion or manipulation of the transcript, using a voice command, such as a voice command to repeat text into the hearing aid, tapping a hearing aid to cause recorded audio to be played back, tapping a hearing aid to cause text to be converted to voice and read back, selecting voice input, scrolling using a sequence of taps or swipes, selecting a speaker's dialog from a list, and tapping to pause the current output signal at the ear-wearable device and instead hear a recent recording.

The system may allow storage and searching of transcriptions. For example, a user may go to a meeting, and it may be difficult to understand everyone in the meeting, but the system will create a transcript for the meeting. This function avoids the user having to ask someone to repeat a statement during the meeting, allows the user to be self-reliant, and could allow the user to search the meeting transcript using phone input.

In some examples, the transcription may be performed concurrently or later than the audio input signal being transcribed was first received. The transcript can be presented on another display other than the display device. For example, the transcript could be shown on a smart glasses device, such as augmented reality glasses that show subtitles.

In some examples, the system may include a multi-language option. A language for the text transcript could be selectable by the user. A commonly-spoken language of the user could be detected by the system, and that language could be set as a default for the transcript function. The system may translate multiple languages into a single-language transcript. The system may use multiple instances of a translate service. The system may use timestamps to sequence into a transcript.

The system may be capable of "Own Voice" detection, where the system knows whether it was the user, in other words the wearer of the ear-wearable device, or someone else. The system may choose not to record or transcribe the user's own voice. The system may choose to transcribe content of the user's own voice after, or with a lower priority than, content from other voices. The system may use the Own Voice detection to ascertain which other speakers are of interest. For example, the system may detect that the user is taking turns talking with or is responsive to another speaker.

Ear-Wearable Device or Hearing Assistance Device (FIGS. 1-4)

Figure 1:
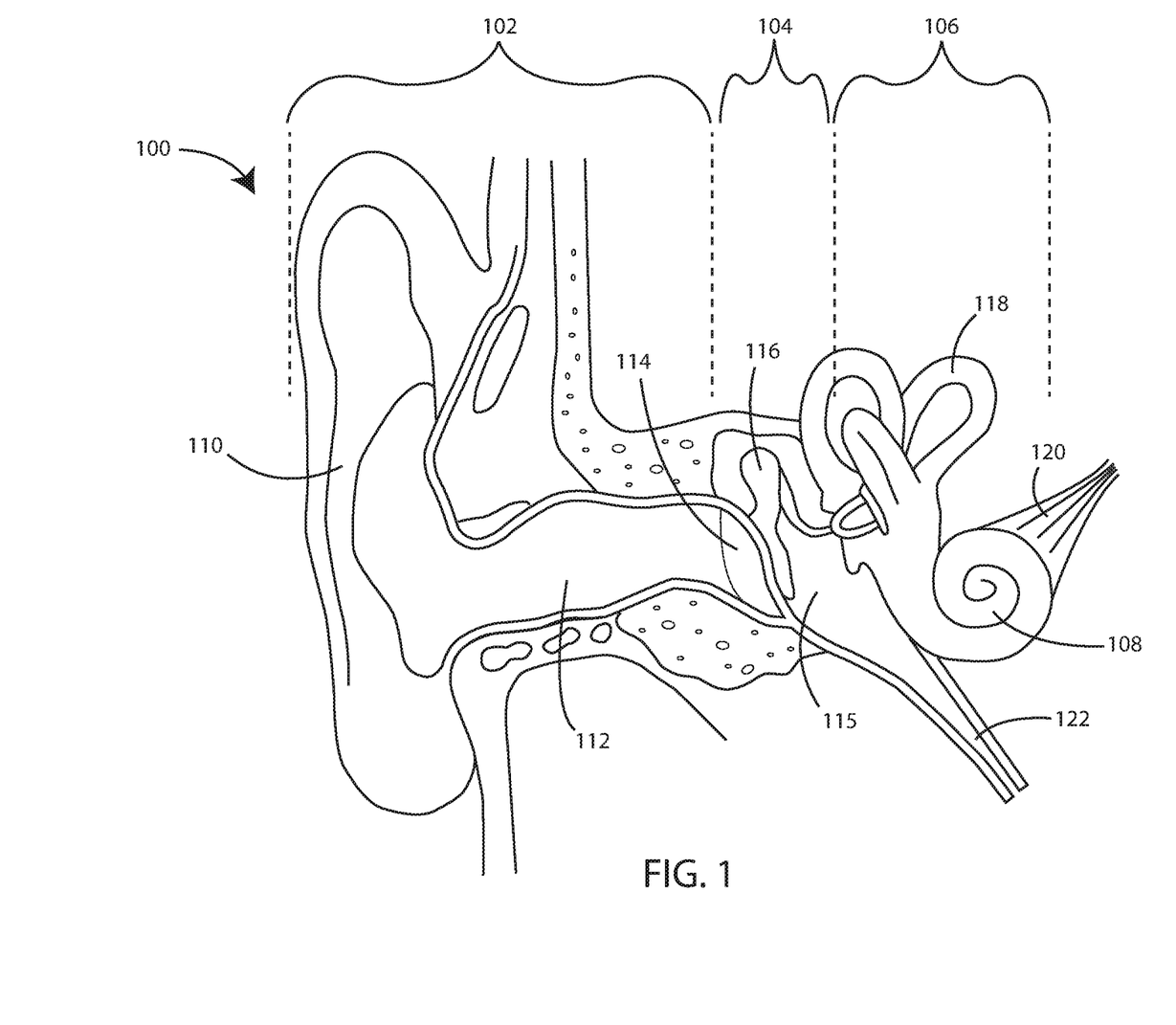
FIG. 1 is a partial cross-sectional view of ear anatomy.

Referring now to FIG. 1, a partial cross-sectional view of ear anatomy 100 is shown. The three parts of the ear anatomy 100 are the outer ear 102, the middle ear 104 and the inner ear 106. The inner ear 106 includes the cochlea 108. The outer ear 102 includes the pinna 110, ear canal 112, and the tympanic membrane 114 (or eardrum). The middle ear 104 includes the tympanic cavity 115, auditory bones 116 (malleus, incus, stapes) and the semicircular canals 118. The inner ear 106 includes the cochlea 108, and the auditory nerve 120. The pharyngotympanic tube 122 is in fluid communication with the Eustachian tube and helps to control pressure within the middle ear generally making it equal with ambient air pressure.

Sound waves enter the ear canal 112 and make the tympanic membrane 114 vibrate. This action moves the tiny chain of auditory bones 116 (ossicles—malleus, incus, stapes) in the middle ear 104. The last bone in this chain contacts the membrane window of the cochlea 108 and makes the fluid in the cochlea 108 move. The fluid movement then triggers a response in the auditory nerve 120.

Hearing assistance devices, such as hearing aids and hearables (e.g., wearable earphones), can include an enclosure, such as a housing or shell, within which internal components are disposed. Components of a hearing assistance device herein can include a control circuit, digital signal processor (DSP), memory (such as non-volatile memory), power management circuitry, a data communications bus, one or more communication devices (e.g., a radio, a near-field magnetic induction device), one or more antennas, one or more microphones, a receiver/speaker, and various sensors as described in greater detail below. More advanced hearing assistance devices can incorporate a long-range communication device, such as a Bluetooth® transceiver or other type of radio frequency (RF) transceiver.

Figure 2:
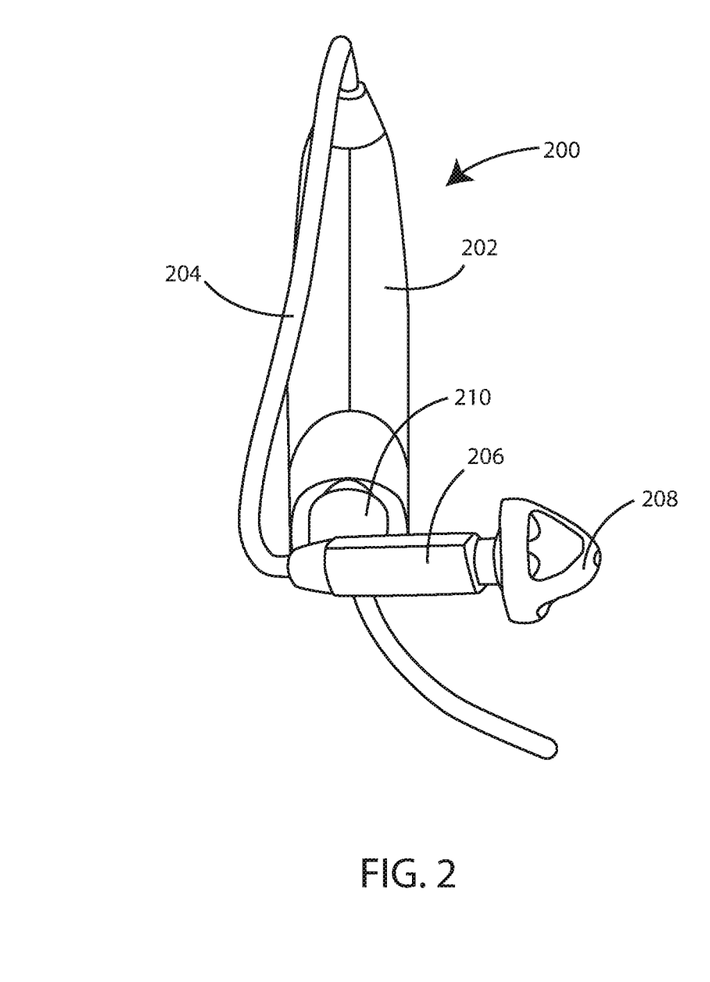
FIG. 2 is a schematic view of a hearing assistance device in accordance with various embodiments herein.

Referring now to FIG. 2, a schematic view of a hearing assistance device 200 is shown in accordance with various embodiments herein. The hearing assistance device 200 can include a hearing assistance device housing 202. The hearing assistance device housing 202 can define a battery compartment 210 into which a battery can be disposed to provide power to the device. The hearing assistance device 200 can also include a receiver 206 adjacent to an earbud 208. The receiver 206 an include a component that converts electrical impulses into sound, such as an electroacoustic transducer, speaker, or loud speaker. A cable 204 or connecting wire can include one or more electrical conductors and provide electrical communication between components inside of the hearing assistance device housing 202 and components inside of the receiver 206.

The hearing assistance device 200 shown in FIG. 2 is a receiver-in-canal type device and thus the receiver is designed to be placed within the ear canal. However, it will be appreciated that may different form factors for hearing assistance devices are contemplated herein. As such, hearing assistance devices herein can include, but are not limited to, behind-the-ear (BTE), in-the ear (ITE), in-the-canal (ITC), invisible-in-canal (IIC), receiver-in-canal (RIC), receiver in-the-ear (RITE) and completely-in-the-canal (CIC) type hearing assistance devices. Aspects of hearing assistance devices and functions thereof are described in U.S. Pat. No. 9,848,273; U.S. Publ. Pat. Appl. No. 20180317837; and U.S. Publ. Pat. Appl. No. 20180343527, the content of all of which is herein incorporated by reference in their entirety.

Hearing assistance devices of the present disclosure can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4. 2 or 5.0, and Bluetooth® Long Range) specification, for example. It is understood that hearing assistance devices of the present disclosure can employ other radios, such as a 900 MHz radio. Hearing assistance devices of the present disclosure can be configured to receive streaming audio (e.g., digital audio data or files) from an electronic or digital source. Hearing assistance devices herein can also be configured to switch communication schemes to a long-range mode of operation, wherein, for example, one or more signal power outputs may be increased, and data packet transmissions may be slowed or repeated to allow communication to occur over longer distances than that during typical modes of operation. Representative electronic/digital sources (also serving as examples of accessory devices herein) include an assistive listening system, a TV streamer, a radio, a smartphone, a cell phone/entertainment device (CPED), a pendant, wrist-worn device, or other electronic device that serves as a source of digital audio data or files.

Figure 3:
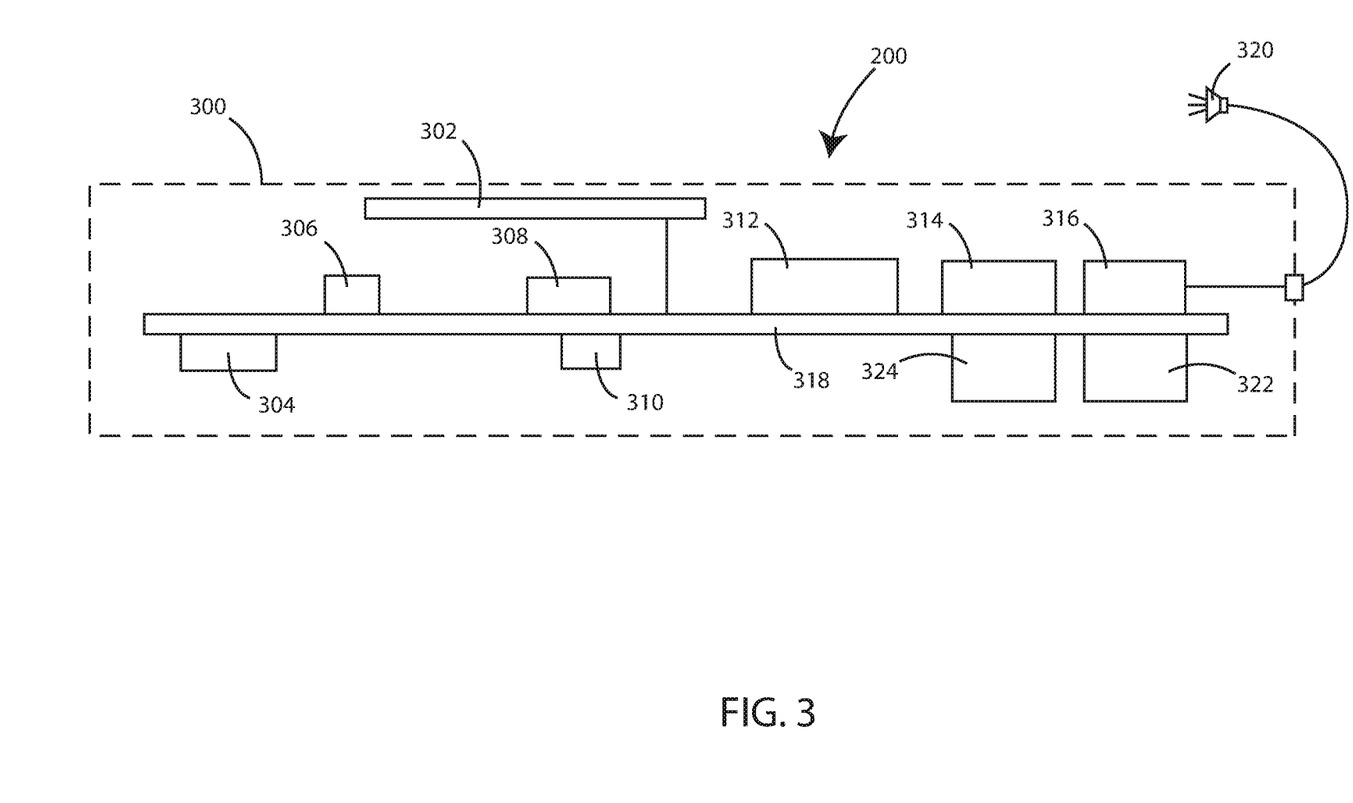
FIG. 3 is a schematic view of various components of a hearing assistance device in accordance with various embodiments herein.

Referring now to FIG. 3, a schematic block diagram is shown with various components of a hearing assistance device in accordance with various embodiments. The block diagram of FIG. 3 represents a generic hearing assistance device for purposes of illustration. The hearing assistance device 200 shown in FIG. 3 includes several components electrically connected to a flexible mother circuit 318 (e.g., flexible mother board) which is disposed within housing 300. A power supply circuit 304 can include a battery and can be electrically connected to the flexible mother circuit 318 and provides power to the various components of the hearing assistance device 200. One or more microphones 306 are electrically connected to the flexible mother circuit 318, which provides electrical communication between the microphones 306 and a digital signal processor (DSP) 312. Among other components, the DSP 312 incorporates or is coupled to audio signal processing circuitry configured to implement various functions described herein. A sensor package 314 can be coupled to the DSP 312 via the flexible mother circuit 318. The sensor package 314 can include one or more different specific types of sensors such as those described in greater detail below. One or more user switches 310 (e.g., on/off, volume, mic directional settings) are electrically coupled to the DSP 312 via the flexible mother circuit 318.

An audio output device 316 is electrically connected to the DSP 312 via the flexible mother circuit 318. In some embodiments, the audio output device 316 comprises a speaker (coupled to an amplifier). In other embodiments, the audio output device 316 comprises an amplifier coupled to an external receiver 320 adapted for positioning within an ear of a wearer. The external receiver 320 can include an electroacoustic transducer, speaker, or loud speaker. The hearing assistance device 200 may incorporate a communication device 308 coupled to the flexible mother circuit 318 and to an antenna 302 directly or indirectly via the flexible mother circuit 318. The communication device 308 can be a Bluetooth® transceiver, such as a BLE (Bluetooth® low energy) transceiver or other transceiver (e.g., an IEEE 802.11 compliant device). The communication device 308 can be configured to communicate with one or more external devices, such as those discussed previously, in accordance with various embodiments. In various embodiments, the communication device 308 can be configured to communicate with an external visual display device such as a smart phone, a video display screen, a tablet, a computer, or the like.

In various embodiments, the hearing assistance device 200 can also include a control circuit 322 and a memory storage device 324. The control circuit 322 can be in electrical communication with other components of the device. The control circuit 322 can execute various operations, such as those described herein. The control circuit 322 can include various components including, but not limited to, a microprocessor, a microcontroller, an FPGA (field-programmable gate array) processing device, an ASIC (application specific integrated circuit), or the like. The memory storage device 324 can include both volatile and non-volatile memory. The memory storage device 324 can include ROM, RAM, flash memory, EEPROM, SSD devices, NAND chips, and the like. The memory storage device 324 can be used to store data from sensors as described herein and/or processed data generated using data from sensors as described herein, including, but not limited to, information regarding exercise regimens, performance of the same, visual feedback regarding exercises, and the like.

Figure 4:
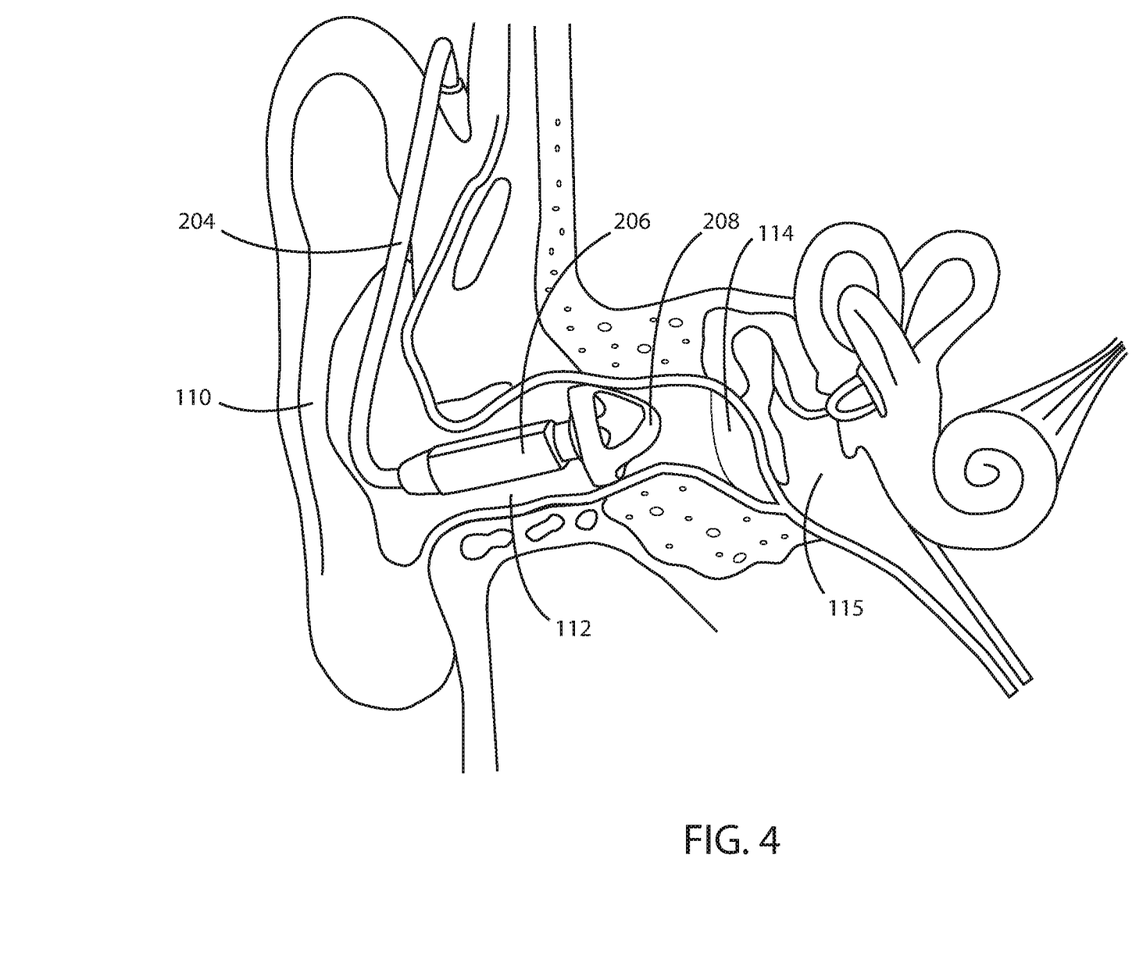
FIG. 4 is a schematic view of a hearing assistance device disposed within the ear of a subject in accordance with various embodiments herein.

As mentioned with regard to FIG. 2, the hearing assistance device 200 shown in FIG. 2 is a receiver-in-canal type device and thus the receiver is designed to be placed within the ear canal. Referring now to FIG. 4, a schematic view is shown of a hearing assistance device disposed within the ear of a subject in accordance with various embodiments herein. In this view, the receiver 206 and the earbud 208 are both within the ear canal 112, but do not directly contact the tympanic membrane 114. The hearing assistance device housing is mostly obscured in this view behind the pinna 110, but it can be seen that the cable 204 passes over the top of the pinna 110 and down to the entrance to the ear canal 112.

While FIG. 4 shows a single hearing assistance device, it will be appreciated that subjects can utilize two hearing assistance devices, such as one for each ear. In such cases, the hearing assistance devices and sensors therein can be disposed on opposing lateral sides of the subject's head. In specific, the hearing assistance devices and sensors therein can be disposed in a fixed position relative to the subject's head. In some embodiments, the hearing assistance devices and sensors therein can be disposed within opposing ear canals of the subject. In some embodiments, the hearing assistance devices and sensors therein can be disposed on or in opposing ears of the subject. The hearing assistance devices and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing.

Systems herein, and in particular components of systems such as hearing assistance devices herein, can include sensors (such as part of a sensor package 314) to detect movements of the subject wearing the hearing assistance device. Exemplary sensors are described in greater detail below. For example, movements (motion) detected can include forward/back movements, up/down movements, and rotational movements in the vertical plane. In various embodiments herein, subjects can wear two hearing assistance devices. The two hearing assistance devices can be paired to one another as a binaural set and can directly communicate with one another. Movements detected, amongst others, can also include side-to-side movements and rotational movements in the horizontal plane. As described above, embodiments of systems herein, such as hearing assistance devices, can track the motion or movement of a subject using motion sensors associated with the hearing assistance devices and/or associated with accessory devices. The head position and head motion of the subject can be tracked. The posture and change in posture of the subject can be tracked. The acceleration associated with movements of the subject can be tracked.

Figure 5:
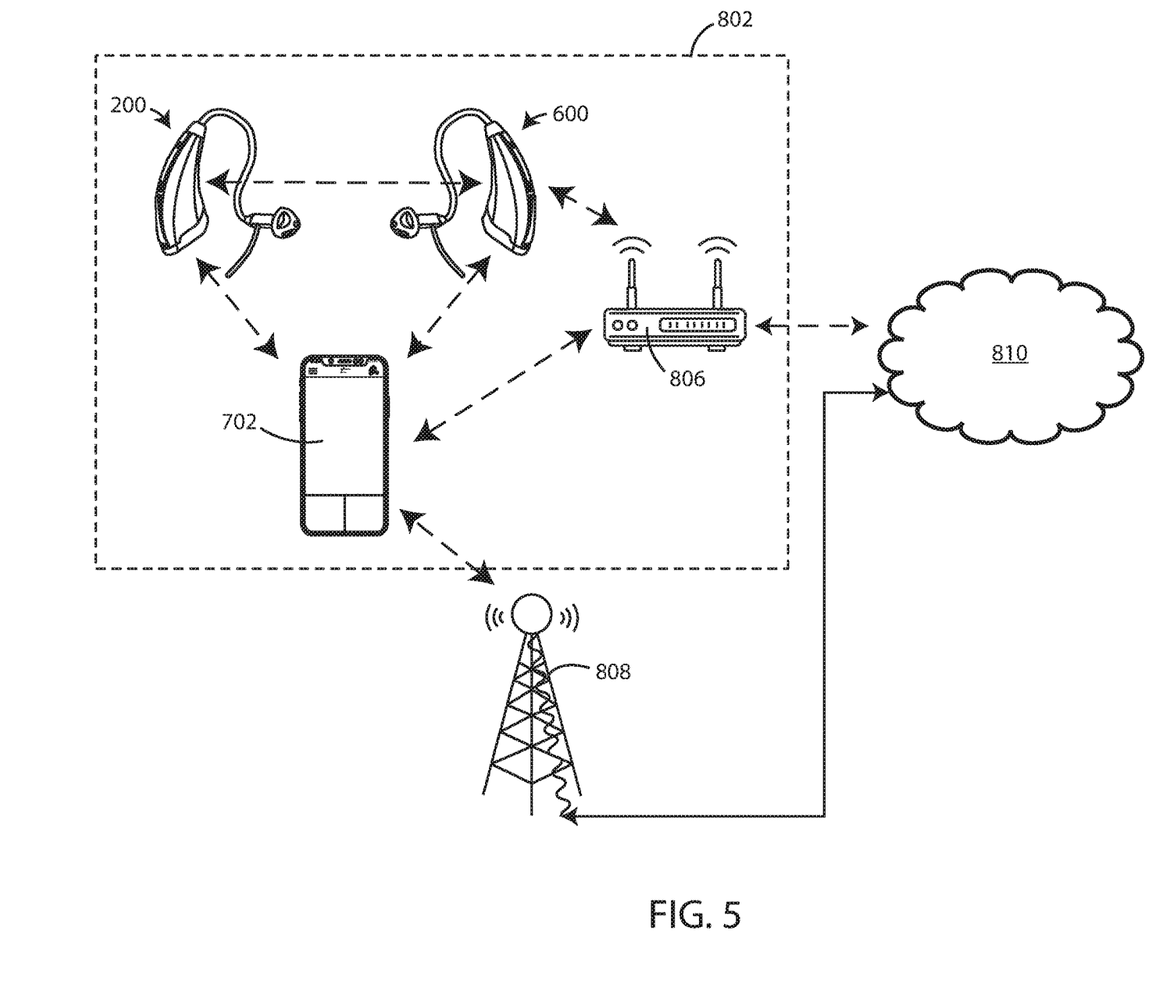
FIG. 5 is a schematic diagram of data and/or electronic signal flow as part of a system in accordance with various embodiments herein.

System Including Ear-Wearable Devices and Display Device (FIG. 5)

FIG. 5 is a schematic diagram of data and/or electronic signal flow as part of a system in accordance with various embodiments herein. A user wearing a hearing assistance device 200 may also have a display device 702. A display device has a visual display screen. The display device may also be referred to as a gateway device, and may have access to network resources, such as a cellular network or another wide area network. The display device has the ability to communicate wirelessly with the ear-wearable device. Examples of a display device include a smart phone, computer tablet, or laptop computer, cellular telephone, personal digital assistant, personal computer, streaming device, wide area network device, personal area network device, remote microphone, smart watch, home monitoring device, internet gateway, hearing device programmer, smart glasses, a captioning device, and combinations thereof, or the like. Hardware components consistent with various display devices are described in U.S. Publ. Appl. No. 2018/0341582, the content of which is herein incorporated by reference. Hardware components, software components, and options for functionality of the system are described in provisional patent application U.S. 62/788,814, titled "Local Artificial Intelligence Assistant for Ear-Wearable Device," filed on Jan. 5, 2019, the content of which is incorporated herein by reference. Hardware components, software components, and options for functionality of the system are also described in co-pending nonprovisional patent application filed on the even date herewith, titled "Local Artificial Intelligence Assistant with Ear-Wearable Device," the content of which are is incorporated herein by reference.

The hearing assistance device 200 is worn in a fixed position relative to the user's head. As a result, at most times it is easily accessible to the user. It is also possible for the user to have or wear an accessory device, such as a smart watch. Some accessory devices can be worn so that they are fixed in relation to the user's body, such as a smart watch or smart glasses. A fixed relationship to the user's body allows the accessory device to be easily accessible to the user. The fixed relationship also enables the accessory device to include a sensor that can gather sensor data about the user and the user's movement. Accessory devices herein can include, but are not limited to, a smart phone, cellular telephone, personal digital assistant, personal computer, streaming device, wide area network device, personal area network device, remote microphone, smart watch, home monitoring device, internet gateway, hearing aid accessory, TV streamer, wireless audio streaming device, landline streamer, remote control, Direct Audio Input (DAI) gateway, audio gateway, telecoil receiver, hearing device programmer, charger, drying box, smart glasses, a captioning device, a wearable or implantable health monitor, and combinations thereof, or the like. Hardware components consistent with various accessory devices are described in U.S. Publ. Appl. No. 2018/0341582, previously incorporated by reference.

It will be appreciated that data and/or signals can be exchanged between many different components in accordance with embodiments herein. Referring now to FIG. 5, a schematic view is shown of data and/or signal flow as part of a system in accordance with various embodiments herein. In a first location 802, a subject (not shown) can have a first hearing assistance device 200 and a second hearing assistance device 600. Each of the hearing assistance devices 200, 600 can include sensor packages as described herein including, for example, a motion sensor. The hearing assistance devices 200, 600 and sensors therein can be disposed on opposing lateral sides of the subject's head. The hearing assistance devices 200, 600 and sensors therein can be disposed in a fixed position relative to the subject's head. The hearing assistance devices 200, 600 and sensors therein can be disposed within opposing ear canals of the subject. The hearing assistance devices 200, 600 and sensors therein can be disposed on or in opposing ears of the subject. The hearing assistance devices 200, 600 and sensors therein can be spaced apart from one another by a distance of at least 3, 4, 5, 6, 8, 10, 12, 14, or 16 centimeters and less than 40, 30, 28, 26, 24, 22, 20 or 18 centimeters, or by a distance falling within a range between any of the foregoing. The fixed relationship of the hearing assistance devices with respect to each other, and corresponding sensors they contain, can permit triangulation of voice signals.

In various embodiments, data and/or signals can be exchanged directly between the first hearing assistance device 200 and the second hearing assistance device 600.

Data and/or signals can be exchanged wirelessly using various techniques including inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11 (wireless LANs) Wi-Fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

A display device 702 such as a smart phone, smart watch, internet gateway, or the like, can also be disposed within the first location 802. The display device 702 can exchange data and/or signals with one or both of the first hearing assistance device 200 and the second hearing assistance device 600 and/or with an accessory to the hearing assistance devices (e.g., a remote microphone, a remote control, a phone streamer, etc.).

Data and/or signals can be exchanged between the display device 702 and one or both of the hearing assistance devices (as well as from a display device to another location or device) using various techniques including, but not limited to inductive techniques (such as near-field magnetic induction—NFMI), 900 MHz communications, 2.4 GHz communications, communications at another frequency, FM, AM, SSB, BLUETOOTH™, Low Energy BLUETOOTH™, Long Range BLUETOOTH™, IEEE 802.11 (wireless LANs) Wi-Fi, 802.15 (WPANs), 802.16 (WiMAX), 802.20, and cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is also possible that forms of wireless mesh networks may be utilized to support communications between various devices, including devices worn by other individuals. It is understood that the standards which can be used include past and present standards. It is also contemplated that future versions of these standards and new future standards may be employed without departing from the scope of the present subject matter.

The display device 702 can also exchange data across a data network to the cloud 810, such as through a wireless signal connecting with a local display device, such as over a mesh network, such as a network router 806 or through a wireless signal connecting with a cell tower 808 or similar communications tower. In some embodiments, the external visual display device can also connect to a data network to provide communication to the cloud 810 through a direct wired connection.

Figure 6:
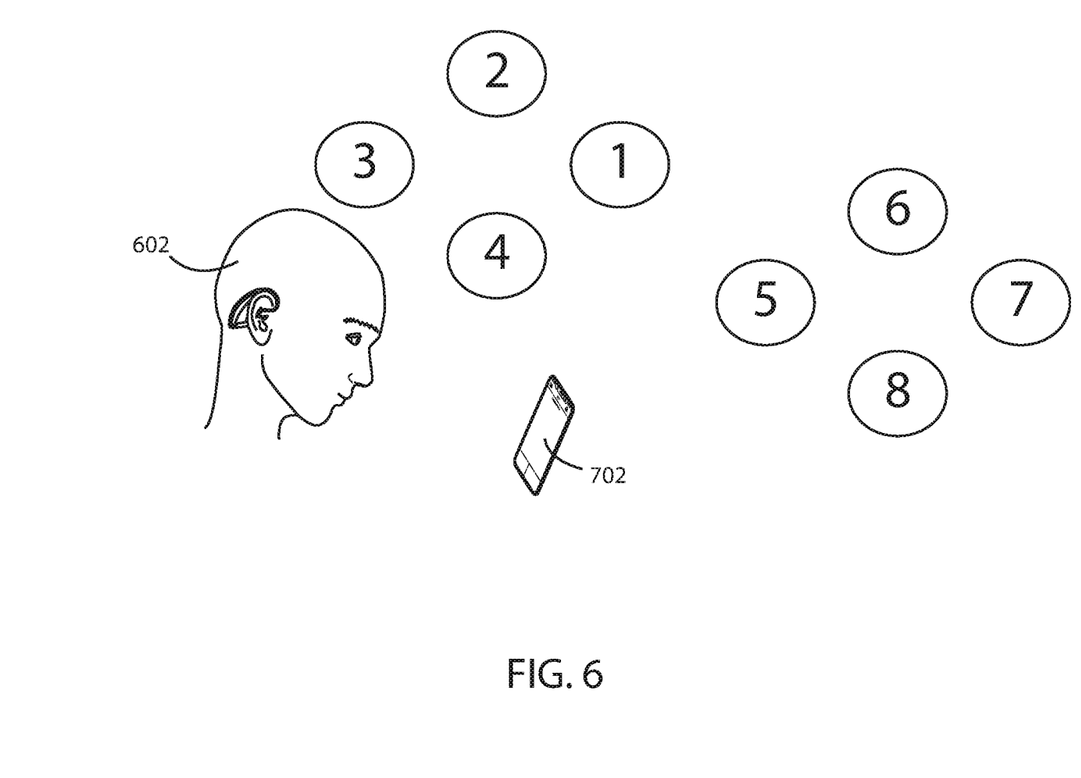
FIG. 6 is a schematic view of user in a group of people wearing an ear-wearable device and looking at an external visual display device in accordance with various embodiments herein.

User in a Group of Voice Signals (FIG. 6)

FIG. 6 is a schematic view of user 602 wearing an ear-wearable device, near in a group of people 1-8. The user views the display device 702 and the transcript presented on the display device 702 to assist with understanding what is said around the user. For example, the user can select speakers 1-4 for transcription, and exclude speakers 5-8. The user can make these sections using the display device 702 or using other input options, such as using the ear-wearable device to provide input.

Figure 7:
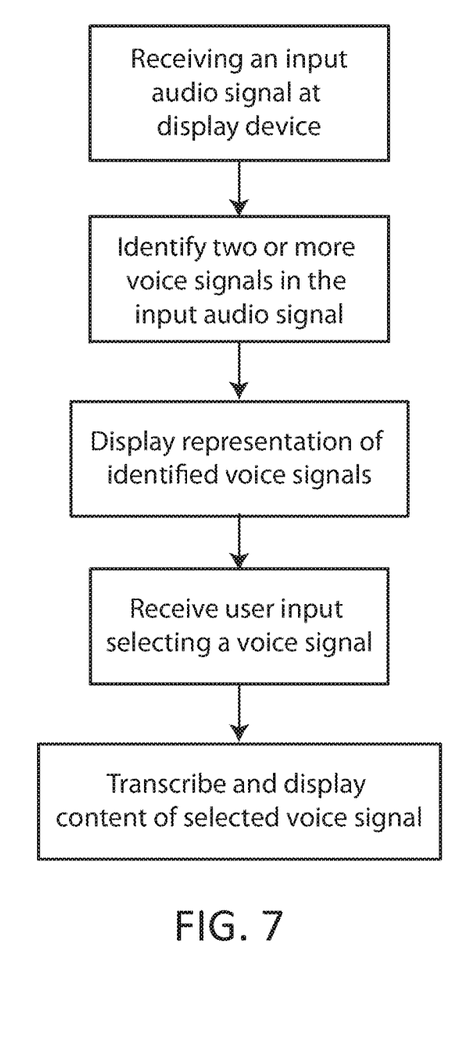
FIG. 7 is a flowchart showing steps of a method of the system.

Method of Transcribing Using an Ear-Wearable Device (FIG. 7)

FIG. 7 is a flowchart showing steps of a method of the system. In one example of a method of automatic transcription using a visual display device and an ear-wearable device, system receives an input audio signal at the display device. The input audio signal may be received at the display device from a microphone on the display device. Alternatively, or in addition, the input audio signal may be received by the microphone on the ear-wearable device and then transmitted via wireless communication device of the ear-wearable device to the display device. Alternatively, or in addition, the input audio signal may be received by an audio coil and then transmitted via wireless communication to the display device.

The method of FIG. 7 further includes processing the input audio signal to identify two or more signals, such as a first voice signal and a second voice signal from the input audio signal. The first voice signal includes characteristics indicating a first source for the first voice signal and the second voice signal includes characteristics indicating a second source for the voice signal. Examples of characteristics indicating a particular source for a voice signal include text-based content and text-independent information. The system can be trained to recognize a particular voice signal by having the speaker provide audio samples of particular phrases. Alternatively, or in addition, the system can analyze a voice signal without cooperation from the speaker.

Another step of the method is displaying on the display device a representation of the first voice signal and the second voice signal. Then, the system receives user input selecting one of the first voice signal and the second voice signal as a selected voice signal. Next, the system converts the selected voice signal to text data and displays a transcript on the display device, wherein the transcript comprises content spoken in the input audio signal. Further, the system can generate an output signal sound at the first transducer of the ear-wearable device based on the input audio signal.

The system stores a voice profile comprising characteristics indicating a specific speaker for the first voice signal or the second voice signal. Another aspect of the system is associating the stored voice profile with a contact record comprising a name of the specific speaker. This association can be performed by the user via the display device. Alternatively, or in addition, this association can be automatically performed based on information stored in the display device or user database.

In various embodiments, the user can assign a priority level to the first voice signal or the second voice signal. A higher priority can be assigned to any voice signal having a stored voice profile. Higher priority content can be transcribed earlier than lower priority content. If a voice associated with stored voice profile is detected, the display device can display a prompt to ask a user whether to transcribe the known voice signal. In addition, or alternatively, the system can output an audio query signal to the first transducer of the ear-wearable device to ask the user whether to transcribe the known voice signal.

In various examples, the display device can display a prompt requesting user input on a direction of a desired voice signal. After receiving input from the user on a direction of a desired voice signal, the system can prioritize voice signals coming from the selected direction and is more likely to transcribe the content that is most important to the user.

In various embodiments, the system can detect a user voice signal from a user wearing the ear-wearable device and process the input audio signal to exclude content of the user voice signal from the transcript.

There are many options for receiving user input, including receiving user input at the ear-wearable device and wirelessly transmitting the user input to the display device. This approach increases convenience to the user, enabling the user to provide input using the ear wearable device instead of interfacing with the display device, which might involve directing eye contact away from a speaker in the verbal interaction. Options for receiving user input at the ear-wearable device include detecting a vibration sequence comprising one or more taps on the ear-wearable device by the first microphone or by an inertial motion sensor in the ear-wearable device, detecting a head nod motion or a head shake motion of a user by an inertial motion sensor in the ear-wearable device, and receiving voice commands at the first microphone.

Figure 9:
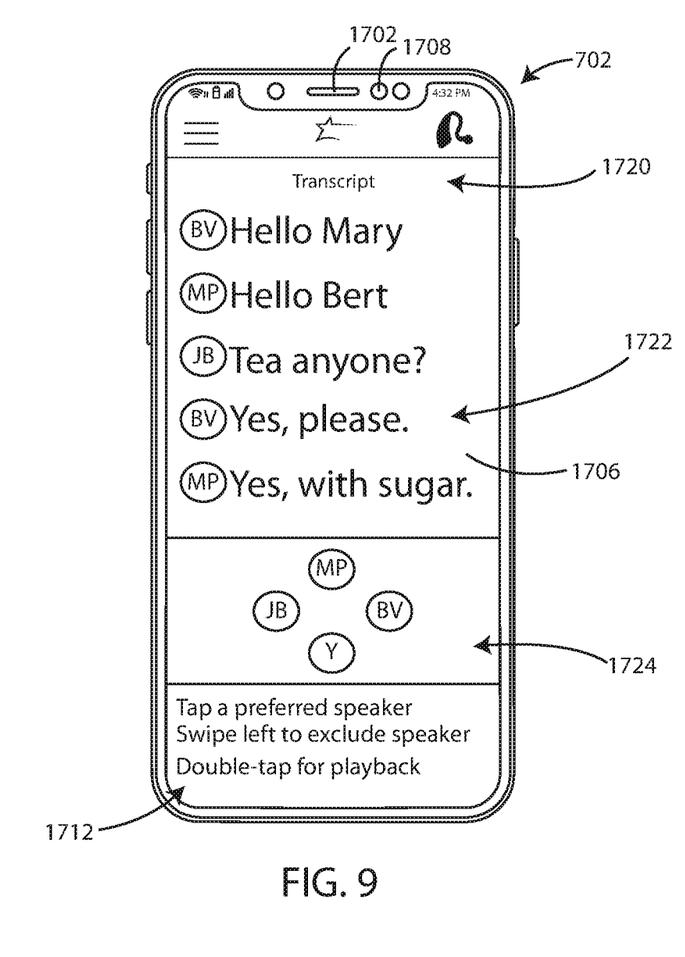

Transcript Display and Controls on the Display Device (FIGS. 8-9)

FIGS. 8 and 9 are schematic views of an external visual display device and elements of a display screen thereof in accordance with various embodiments herein. Many visual display options are contemplated herein. In specific, visual elements of the display screen 1706 are shown in accordance with various embodiments herein. The display device 702 can include a speaker 1702. The display device 702 can generate and/or display a user interface and the display screen 1706 can be a touchscreen to receive input from the subject/user. In some embodiments, the accessory device 702 can include a camera 1708.

The display screen 1706 visual elements can include an automatic transcription and note taking system 1720. The display screen 1706 can be used to present a transcript to the user, where the transcript displays text from one or more voice signals.

In one example shown in FIG. 8, the system presents a transcript to the user including the text from three voice signals generated by three different speakers other than the user. The transcript shows a number 1, 2 or 3 for each speaker, and shows text next to the number that is spoken by each speaker. The display also includes a map 1724 showing the relative locations of the speakers 1, 2 and 3 and the user represented with the letter U. The display also includes a command list 1712 providing the user with input options for controlling the system.

In one example shown in FIG. 9, the system labels the transcript and map with initials corresponding to each speaker. Stored voice signals for each speaker can be associated with that speaker's characteristic language patterns and identity information.

Sensors

Systems herein can include one or more sensor packages. The sensors can provide input to the system to improve the function of the system. For example, the sensor can receive input from the user or obtain information about the environment. Sensors can determine aspects including, but not limited to, tracking movement of a subject and tracking head position of the subject. Such movement can be detected and used as user input to the system. For example, a head nod can indicate that the user would like to answer yes to a question asked by the system. The user's head movement as the user follows a conversation can also help the system determine which speaker is associated with a particular voice signal.

The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. Motions sensors can be used to track movement of a subject in accordance with various embodiments herein.

In some embodiments, an IMU is present in an ear-wearable device. In some embodiments, an IMU is present in each of two ear-wearable devices that are worn together by a user. In some embodiments, the motion sensors can be disposed in a fixed position with respect to the head of a subject, such as worn on or near the head or ears. In some embodiments, the motion sensors can be disposed associated with another part of the body such as on a wrist, arm, or leg of the subject.

Sensor packages herein can also include one or more of a magnetometer, microphone, acoustic sensor, or eye movement sensor (e.g., electrooculogram (EOG) sensor).

In some embodiments, the sensor package can be part of a hearing assistance device. However, in some embodiments, the sensor packages can include one or more additional sensors that are external to a hearing assistance device. The one or more additional sensors can comprise one or more of an IMU, accelerometer, gyroscope, barometer, magnetometer, an acoustic sensor, or eye motion tracker. For example, the one or more additional sensors can include a wrist-worn or ankle-worn sensor package, a sensor package supported by a chest strap, a sensor package integrated into a medical treatment delivery system, or a sensor package worn inside the mouth.

The sensor package of a hearing assistance device can be configured to sense motion of the wearer. Data produced by the sensor(s) of the sensor package can be operated on by a processor of the device or system.

According to various embodiments, the sensor package can include one or more of an IMU, and accelerometer (3, 6, or 9 axis), a gyroscope, a barometer, an altimeter, a magnetometer, an eye movement sensor, a pressure sensor, an optical sensor, and the like.

As used herein the term "inertial measurement unit" or "IMU" shall refer to an electronic device that can generate signals related to a body's specific force and/or angular rate. IMUs herein can include one or more of an accelerometer and gyroscope (3, 6, or 9 axis) to detect linear acceleration and a gyroscope to detect rotational rate. In some embodiments, an IMU can also include a magnetometer to detect a magnetic field. In some embodiments, an IMU can also include a barometer.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

The sensor package can include one or more sensors that are external to the hearing assistance device. In addition to the external sensors discussed hereinabove, the sensor package can comprise a network of body sensors (such as those listed above) that sense movement of a multiplicity of body parts (e.g., arms, legs, torso).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method of automatic transcription using a visual display device and an ear-wearable device configured to be worn by a user in contact with an ear of the user, wherein the ear-wearable device comprises a first control circuit, a first electroacoustic transducer for generating sound in electrical communication with the first control circuit, a first microphone in electrical communication with the first control circuit, a memory storage, and a wireless communication device, wherein the ear-wearable device is configured to direct sound from the first transducer toward the user's ear when the ear-wearable device is worn by the user, the visual display device comprising a second control circuit and a second wireless communication device, the method comprising:
   receiving an input audio signal at the display device, the input audio signal comprising a first voice signal originating from a first speaker and a second voice signal originating from a second speaker;
   processing the input audio signal to identify the first voice signal and the second voice signal from the input audio signal, wherein the first voice signal comprises characteristics indicating the first speaker as source for the first voice signal and the second voice signal comprises characteristics indicating the second speaker as source for the second voice signal;
   displaying on the display device a representation of the first voice signal and the second voice signal;
   receiving user input from the user at either the ear-wearable device or the display device selecting one of the first voice signal and the second voice signal as a selected voice signal;
   converting the selected voice signal of the first voice signal or second voice signal to text data;
   displaying a transcript on the display device, wherein the transcript comprises content spoken in the input audio signal by the selected voice signal of the first voice signal or second voice signal; and
   generating an output signal sound at the first transducer of the ear-wearable device based on the input audio signal, whereby the output signal is relayed to the user's ear by the first transducer.

2. The method of claim 1 further comprising:
   storing a first voice profile comprising the characteristics indicating the first speaker for the first voice signal.

3. The method of claim 2 further comprising associating the stored first voice profile with a contact record comprising a name of the first speaker.

4. The method of claim 2 further comprising assigning a priority level to the first voice signal or the second voice signal, wherein a higher priority is assigned to any voice signal having a stored voice profile.

5. The method of claim 2 wherein displaying the transcript on the display device comprises prioritizing content spoken by a specific speaker associated with a stored voice profile.

6. The method of claim 2 further comprising:
   detecting, in the input audio signal, the first voice signal associated with the stored first voice profile; and
   either:
   displaying on the display device a prompt to ask the user whether to transcribe the first voice signal; or
   outputting an audio query signal to the first transducer of the ear-wearable device to ask the user whether to transcribe the first voice signal.

7. The method of claim 1 further comprising:
   displaying on the display device a prompt requesting user input on a direction of a desired voice signal.

8. The method of claim 1 further comprising:
   detecting a user voice signal from the user wearing the ear-wearable device; and
   processing the input audio signal to exclude content of the user voice signal from the transcript.

9. The method of claim 1 further comprising receiving user input at the ear-wearable device and wirelessly transmitting the user input to the display device.

10. The method of claim 9 wherein receiving user input at the ear-wearable device comprises one of:
    detecting a vibration sequence comprising one or more taps on the ear-wearable device by the first microphone or by an inertial motion sensor in the ear-wearable device;
    detecting a head nod motion or a head shake motion of the user by an inertial motion sensor in the ear-wearable device; and
    receiving voice commands at the first microphone.

11. The method of claim 1, wherein the user is not the first speaker or the second speaker.

12. A system of automatic transcription comprising:
    an ear-wearable device configured to be worn by a user in contact with an ear of the user, the ear-wearable device comprising a first control circuit, a first electroacoustic transducer for generating sound in electrical communication with the first control circuit, a first microphone in electrical communication with the first control circuit, a memory storage, and a wireless communication device, wherein the ear-wearable device is configured to direct sound from the first transducer toward the user's ear when the ear-wearable device is worn by the user; and
    a visual display device comprising a second control circuit, a second wireless communication device, and memory storing computer instructions for instructing the second control circuit to perform:
    receiving an input audio signal at the display device, the input audio signal comprising a first voice signal originating from a first speaker and a second voice signal originating from a second speaker,
    processing the input audio signal to identify the first voice signal and the second voice signal from the input audio signal, wherein the first voice signal comprises characteristics indicating the first speaker source for the first voice signal, and the second voice signal comprises characteristics indicating the second speaker source for the second voice signal,
    displaying on the display device a representation of the first voice signal and the second voice signal, receiving user input from the user at either the ear-wearable device or the display device selecting one of the first voice signal and the second voice signal as a selected voice signal, converting the selected voice signal of the first voice signal or second voice signal to text data, displaying a transcript on the display device, wherein the transcript comprises content spoken in the input audio signal by the selected voice signal of the first voice signal or second voice signal, and generating an output signal sound at the first transducer of the ear-wearable device based on the input audio signal, whereby the output signal is relayed to the user's ear by the first transducer.

13. The system of claim 12, the memory further storing computer instructions for instructing the second control circuit to:

store a first voice profile comprising characteristics indicating the first speaker as source for the first voice signal.

14. The system of claim 13, the memory further storing computer instructions for instructing the second control circuit to associate the first stored voice profile with a contact record comprising a name of the first speaker.

15. The system of claim 13, the memory further storing computer instructions for instructing the second control circuit to assign a priority level to the first voice signal or the second voice signal, wherein a higher priority is assigned to any voice signal having a stored voice profile.

16. The system of claim 13, the memory further storing computer instructions for instructing the second control circuit to prioritize content spoken by a specific speaker associated with a stored voice profile.

17. The system of claim 13, the memory further storing computer instructions for instructing the second control circuit to:

detect a first voice signal associated with the stored first voice profile in the input audio signal; and either:

display on the display device a prompt to ask the user whether to transcribe the first voice signal; or output an audio query signal to the first transducer of the ear-wearable device to ask the user whether to transcribe the first voice signal.

18. The system of claim 12, the memory further storing computer instructions for instructing the second control circuit to:

display on the display device a prompt requesting user input on a direction of a desired voice signal.

19. The system of claim 12, the memory further storing computer instructions for instructing the second control circuit to:

detect a user voice signal from the user wearing the ear-wearable device, wherein the user is not the first speaker or second speaker, and processing the input audio signal to exclude content of the user voice signal from the transcript.

20. The system of claim 12, the memory further storing computer instructions for instructing the second control circuit to:

receive user input at the ear-wearable device and wirelessly transmit the user input to the display device.

21. The system of claim 20, the memory storage of the ear-wearable device memory storing computer instructions for receiving user input at the ear-wearable device by performing:

detecting a vibration sequence comprising a plurality of taps on the ear-wearable device by the first microphone or by an inertial motion sensor in the ear-wearable device;

detecting a head nod motion or a head shake motion of the user by an inertial motion sensor in the ear-wearable device; or receiving voice commands at the first microphone.

\* \* \* \* \*